United States Patent [19]

Zaiser et al.

[11] Patent Number: 5,584,900

[45] Date of Patent: Dec. 17, 1996

[54] APPARATUS FOR CLEANING CYLINDRICAL AIR FILTERS

[76] Inventors: Gregory H. Zaiser, 614 SW. 27th St., Cape Coral, Fla. 33914; Harold W. Zaiser, 5544 Berryman St., Lehigh Acres, Fla. 33971

[21] Appl. No.: 359,055

[22] Filed: Dec. 19, 1994

[51] Int. Cl.$^6$ .................................................. B01D 46/04
[52] U.S. Cl. ................... 55/293; 55/294; 55/300; 55/302; 55/303; 95/278; 95/279
[58] Field of Search .................... 95/278, 279, 280; 55/293, 294, 309, 283, 302, 303; 210/391, 394, 393

[56] References Cited

U.S. PATENT DOCUMENTS

| | | | |
|---|---|---|---|
| 2,406,931 | 9/1946 | Troxler | 55/294 |
| 2,765,048 | 10/1956 | Hersey, Jr. | 55/294 |
| 3,499,267 | 3/1970 | King, Jr. et al. | 55/294 |
| 4,154,588 | 5/1979 | Herndon, Jr. | 55/283 |
| 4,289,510 | 9/1981 | Herndon, Jr. | 55/294 |
| 4,704,144 | 11/1987 | LeBlanc et al. | 55/300 |
| 4,842,624 | 6/1989 | Barton | 55/291 |
| 5,114,444 | 5/1992 | Stuble | 55/294 |
| 5,143,529 | 9/1992 | Means, Jr. | 55/294 |

*Primary Examiner*—Jay H. Woo
*Assistant Examiner*—Duane S. Smith
*Attorney, Agent, or Firm*—William E. Noonan

[57] ABSTRACT

An apparatus for cleaning a generally cylindrical air filter. The apparatus includes a carriage for receiving the air filter in a generally axially vertical orientation. The carriage is selectively turned to orient the filter generally horizontally. Dirt and debris are dislodged selectively from an inside cylindrical surface and an outside cylindrical surface of the filter by a air pressure nozzle and a pneumatic hammer, respectively. A vacuum apparatus collects the dirt and debris that is dislodged from the filter.

18 Claims, 11 Drawing Sheets

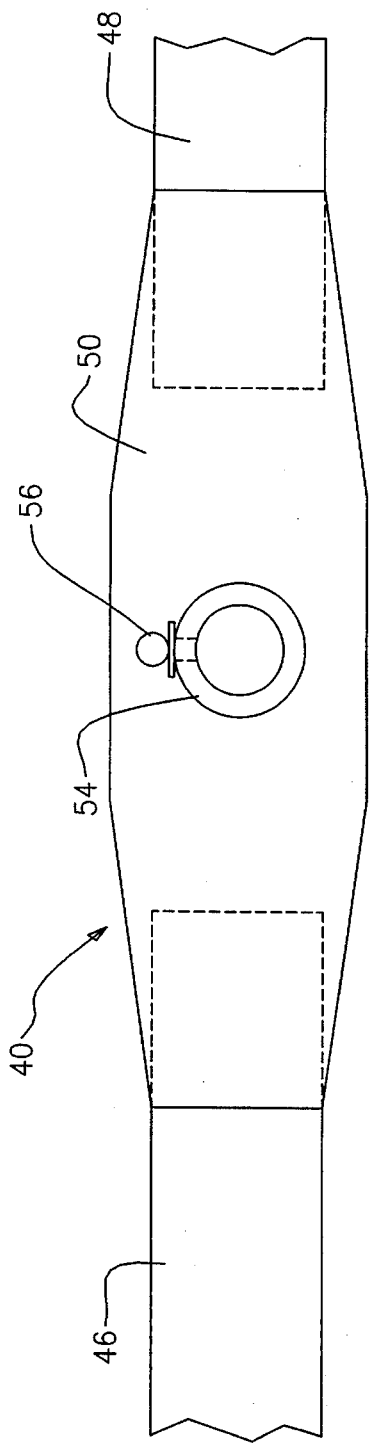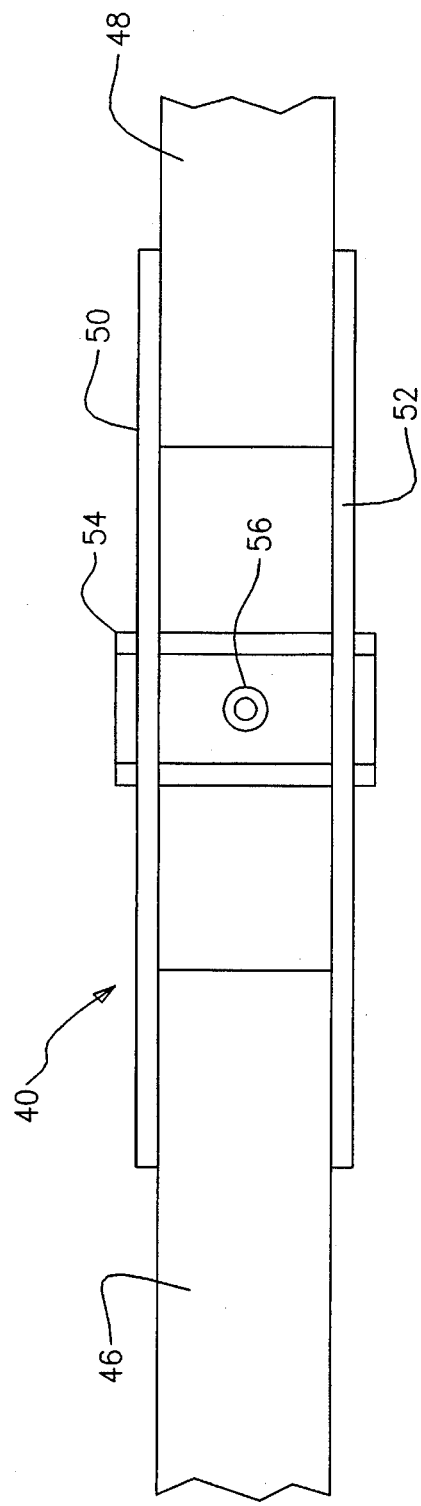

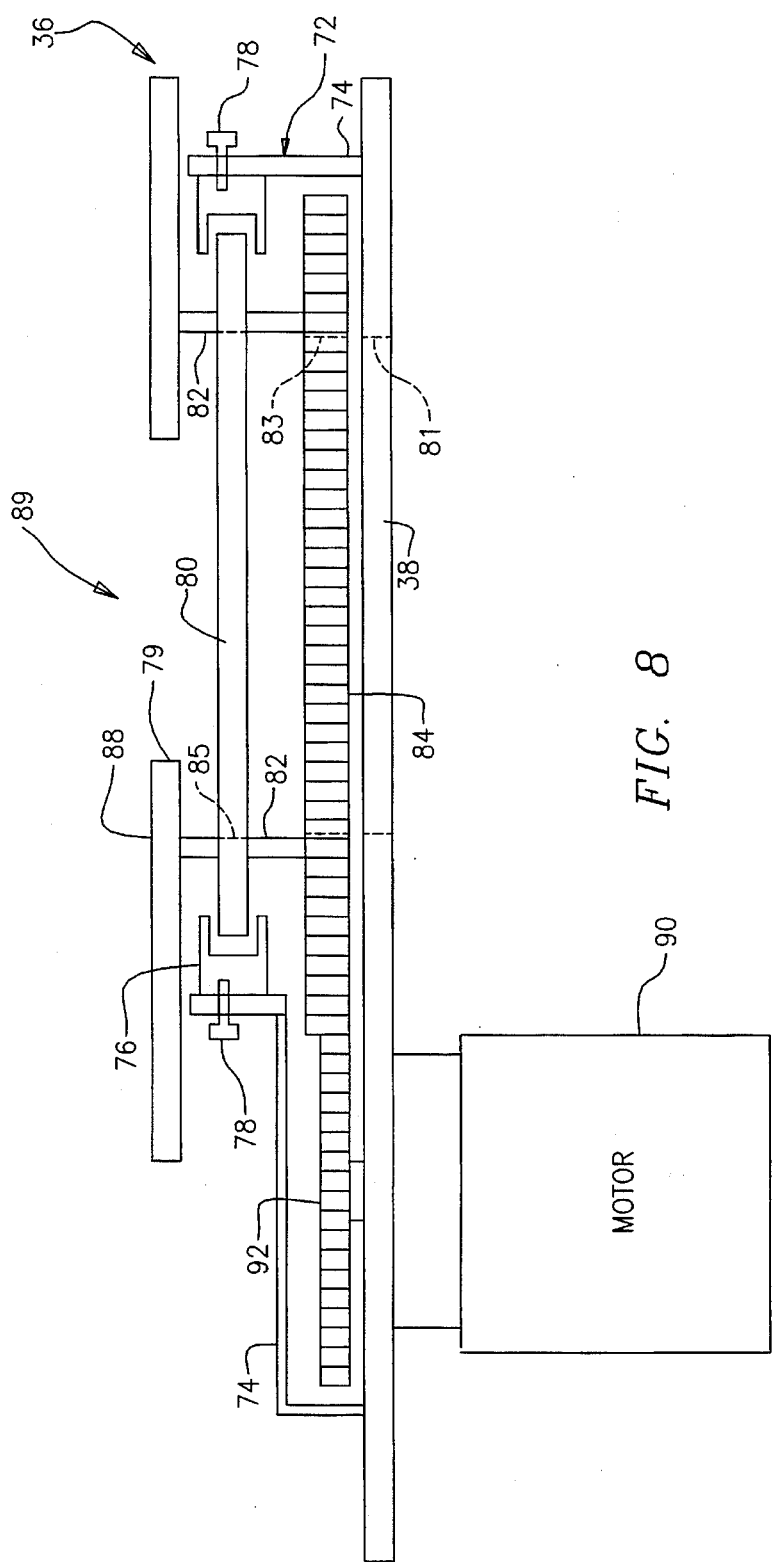
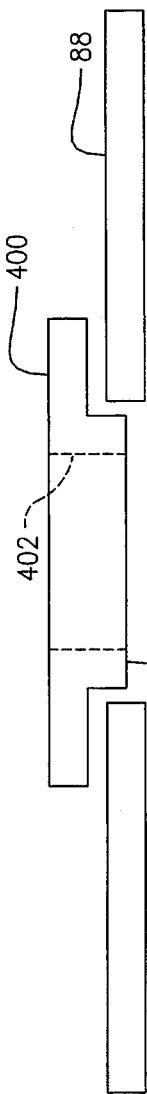
FIG. 8
FIG. 13

APPARATUS FOR CLEANING CYLINDRICAL AIR FILTERS

FIELD OF THE INVENTION

This invention relates to an apparatus for cleaning cylindrical air filters of the type employed in trucks, heavy equipment and other types of machinery.

BACKGROUND OF THE INVENTION

Cylindrical air filters are used in conjunction with a wide variety of air breathing machinery, including trucks and cars, gas turbines, bulldozers and other heavy equipment. Typically, this type of filter employs a perforated metal frame and an enclosed, generally cylindrical pleated paper filter medium having inside and outside surfaces. Some of these filters feature "inside" filtering wherein the dirt and debris are collected on the inside of the cylindrical filter. Others feature "outside" filtering wherein particulates are collected on the outside cylindrical surface. Most automobiles employ relatively inexpensive air filters that are simply discarded and replaced when they become dirty. However, trucks and other types of heavy equipment usually employ air filters that are relatively large and expensive to replace. Accordingly, various techniques have been developed to clean and reuse these large filters. Most often, they are washed in a suitable solvent or cleaning solution. Such washing tends to weaken the paper filter medium so that it is significantly less effective when the filter is replaced.

In an attempt to overcome the disadvantages of cleaning solvents, a number of known devices have employed a "dry" cleaning system wherein dirt and debris are dislodged from the filter and then collected by a vacuum or other suction means. For example, in the device disclosed by U.S. Pat. No. 4,808,234, air pressure is applied simultaneously to the inside and outside cylindrical surfaces of the filter to dislodge dirt from the outside surface. Suction collects this dislodged dirt. As the air pressure is applied, the filter is rotated horizontally about its longitudinal axis. This apparatus is restricted to cleaning outside filters. There is no way that dirt from an inside filter can be collected. Additionally, it is relatively difficult to mount the filter in the machine of Patent No. '234. The operator must manually reach into the cabinet of the apparatus and hold the filter while securing it to a spindle. This is awkward and hazardous and may violate various governmental safety codes and regulations.

In the filter cleaning apparatus disclosed by U.S. Pat. No. 5,143,529, the air filter is mounted upright in a cabinet. High pressure, opposing air nozzles are mounted for vertical movement along the inner and outer surfaces of the filter to dislodge debris therefrom. Similarly, inner and outer vacuum nozzles are mounted adjacent to and movable with the air nozzles for drawing in the dislodged debris. Although this apparatus facilitates handling and mounting of the filter and cleans both inside and outside filters, it also exhibits a number of serious disadvantages. For one thing, it cannot properly clean many narrow, tapered filters that are now commercially available because the inside nozzle often cannot move freely through the central opening of such filters. Additionally, the upright filter rotates during the cleaning process. As a result, when an inside filter is cleaned, centrifugal force causes the dirt and debris to be pushed tightly into the interior pleats. This makes cleaning of the inside surface more difficult. Cleaning is also complicated because as the interior debris falls from the paper filter, much of it drops into corners in the floor of the filter, which are inaccessible to the vacuum. Therefore, the filter is not effectively and completely cleaned.

In neither of the above described devices can the user select either inside or outside cleaning alone. In Patent No. '234 only outside cleaning is possible. In Patent No. '529 both types of cleaning are perfumed on every filter, although virtually all air filters normally require only one type of cleaning (either inside or outside). Moreover, the known systems are not easily adapted for different sizes of filters. Typically, they are programmed to operate for a predetermined time that cannot be automatically shortened or lengthened, as required, for smaller or larger filters.

SUMMARY OF INVENTION

It is therefore an object of the present invention to provide an improved apparatus for cleaning cylindrical air filters of the type used in trucks, heavy equipment and related machinery;

It is a further object of this invention to provide an apparatus for cleaning air filters that may be employed equally effectively for inside and outside cylindrical air filters.

It is a further object of this invention to provide an apparatus for cleaning air filters that exhibits improved cleaning performance by horizontally mounting the filter for cleaning so that dirt and debris are not trapped in the filter pleats or in the bottom of the filter canister It is a further object of this invention to provide an apparatus for cleaning cylindrical air filters that is effective for use with air filters of virtually all sizes and shapes, including, tall and tapered cylindrical air filters.

It is a further object of this invention to provide an apparatus for cleaning air filters that is designed to perform cleaning for as long as a significant amount of dirt and debris remain on the filter and not merely for a predetermined time.

It is a further object of this invention to provide an air filter cleaning apparatus that improves operator safety by permitting the filter to be automatically mounted and manipulated for cleaning, with minimal manual handling.

It is a further object of this invention to provide an apparatus for cleaning cylindrical air filters that employs an improved simplified and relatively maintenance free means for rotating the filter during cleaning.

It is a further object of this invention to provide an air filter cleaning apparatus that achieves improved dislodging and vacuuming of dirt and debris from inside and outside surfaces of the filter.

It is a further object of this invention to provide an air filter cleaning apparatus that operates much more quietly than previous filter cleaning devices.

This invention results from a realization that a cylindrical air filter cleaning apparatus featuring, improved automatic handling and more complete cleaning may be accomplished by utilizing a pivoting carriage for holding the air filter. The carriage is initially in an upright position, wherein the filter is mounted generally vertically in an easy and relatively hands-free fashion. For cleaning, the carriage turns approximately 90°, into a sideways condition, wherein the filter is oriented horizontally for rotation about its horizontal axis. In the latter position, dirt and debris are most effectively dislodged and vacuumed from either the inside cylindrical surface or outside cylindrical surface of the filter.

This invention features an apparatus for cleaning a generally cylindrical air filter, which includes carriage means for receiving and holding the air filter in a generally axial vertical orientation. There are means for selectively turning the carriage means to orient the filter generally horizontally. Means selectively dislodge dirt and debris from an inside cylindrical surface and an outside cylindrical surface of the filter when the filter is oriented generally horizontally. Suction means collect the dirt and debris dislodged from the filter.

In a preferred embodiment, the carriage means may include upper engagement means that contact a first end of the filter, lower engagement means that contact an opposite second end of the filter and means for adjusting the distance between the upper and lower engagement means. The lower engagement means may include an annular base that communicates with the inside cylindrical opening of the filter. The means for adjusting may include selectively expandable and contractible cylinder means that are interconnected between the annular base and the upper engagement means. The cylinder means are expanded to increase the distance between the annular base and upper engagement means and contracted to reduce the distance between the base and the upper engagement means. Means may also be provided for rotating the carriage means and the filter about the filter's longitudinal axis when the filter is generally horizontally oriented. The means for driving preferably include a motor and gear means operably interconnecting the motor and the annular base.

A housing may accommodate the carriage means, turning means, dislodging means and suction means. Preferably, the housing includes a first chamber that contains the carriage means and the filter, an adjacent second chamber, and a wall formed between the first and second chambers. The wall has a vacuum opening that is communicably engaged, on one side of the wall, by the annular base when the filter is horizontally oriented such that the cylindrical central opening of the filter communicates with the vacuum opening. The suction means includes an interior vacuum manifold that communicably engages the vacuum opening on the opposite side of the wall. The means for turning may include pivot means for mounting the carriage means within the housing, a cylinder mechanism pivotably attached to one of the carriage and the housing wall, and a piston operably engaged with the cylinder mechanism and pivotally attached to the other of the carriage means and the housing wall. The cylinder mechanism and the piston are selectively contracted to turn the carriage about the pivot means and engage the annular base with the vacuum opening in the wall. The cylinder mechanism and the piston are alternately expanded to turn the carriage in an opposite second direction about the pivot means to disengage the annular base from the vacuum opening.

The dislodging means may include air pressure nozzle means disposed within the filter and directed generally toward the inside surface of the filter when the filter is generally horizontally oriented. Means provide pressurized air to the nozzle means to dislodge dirt from the inside surface of the filter. The suction means may include an elongate vacuum tube that is disposed within the cylindrical opening in the filter when the filter is generally horizontally oriented. Means draw a vacuum on the tube to create a suction that draws dirt dislodged from the inside surface of the filter into the tube. The means for providing pressurized air may include a pressure line that extends along the vacuum tube. Means may be provided for driving the tube and the pressure line generally longitudinally along the inside surface of the filter. The vacuum tube and the pressure line preferably extend from the second chamber through the vacuum opening and into the cylindrical opening of the filter located in the first chamber.

The means for dislodging may further include a hammer and means for directing the hammer to selectively strike the outside cylindrical surface of the filter. Means are provided for driving, the hammer along a path generally parallel to the axis of the filter when the filter is generally horizontally oriented. Outside air nozzles may be directed at the outside surface of the filter.

An outside vacuum means may also communicate with the first chamber through the housing, wall and may extend at least partly through the second chamber for collecting dirt and debris dislodged from the outside surface of the filter. In particular, an outside vacuum manifold may be communicably connected to the first chamber outwardly of the outside surface of the filter. A common vacuum source may be used for both the inside and outside vacuum manifolds and valve means may be provided for selectively connecting, the vacuum source to one of the inside and outside vacuum manifolds to clean the inside and outside surfaces, respectively, of the filter. Means, such as a dirt sensor, may be disposed within the suction means to determine the level of dirt and debris being collected. Means, responsive to the sensor means, may be provided for deactivating the dislodging, means when the dirt and debris being, collected falls below a predetermined level.

The apparatus may be automatically controlled by a microprocessor or similar means.

DETAILED DESCRIPTION OF PREFERRED EMBODIMENTS

Other objects, features and advantages will occur from the following description of preferred embodiments and the accompanying drawings, in which:

FIG. 1 is an elevational side view, partly cut away and simplified, of an air filter cleaning, apparatus, according to this invention. Particularly shown are the carriage means and the means for turning, the carriage means between generally vertical and generally horizontal positions. Most of the remaining internal components are omitted for clarity.

FIG. 2 is a view, similar to FIG. 1, of additional components of the cleaning, apparatus and particularly illustrating, the vacuum tube and inside pressure nozzle engaged with the filter in a generally horizontal orientation. The outside hammer mechanism and the mechanism for operating the dirt dislodging, devices are also partly shown. Most remaining, components are omitted for clarity.

FIG. 3 is a view, similar to FIGS. 1 and 2, illustrating the suction means of the apparatus. More specifically, operation of the vacuum means for cleaning, the inside cylindrical surface of the filter is illustrated. Most remaining, components are omitted for clarity.

FIGS. 6A and 6B are top and side views, respectively, of a portion of the structure for supporting the upper engagement means in the carriage.

FIG. 8 is an elevational, partly schematic view of the annular base for supporting the air filter and the drive mechanism for rotating the filter about its longitudinal axis.

FIG. 13 is a side view of a mechanism for attaching smaller diameter filters to the carriage.

Figure 1:
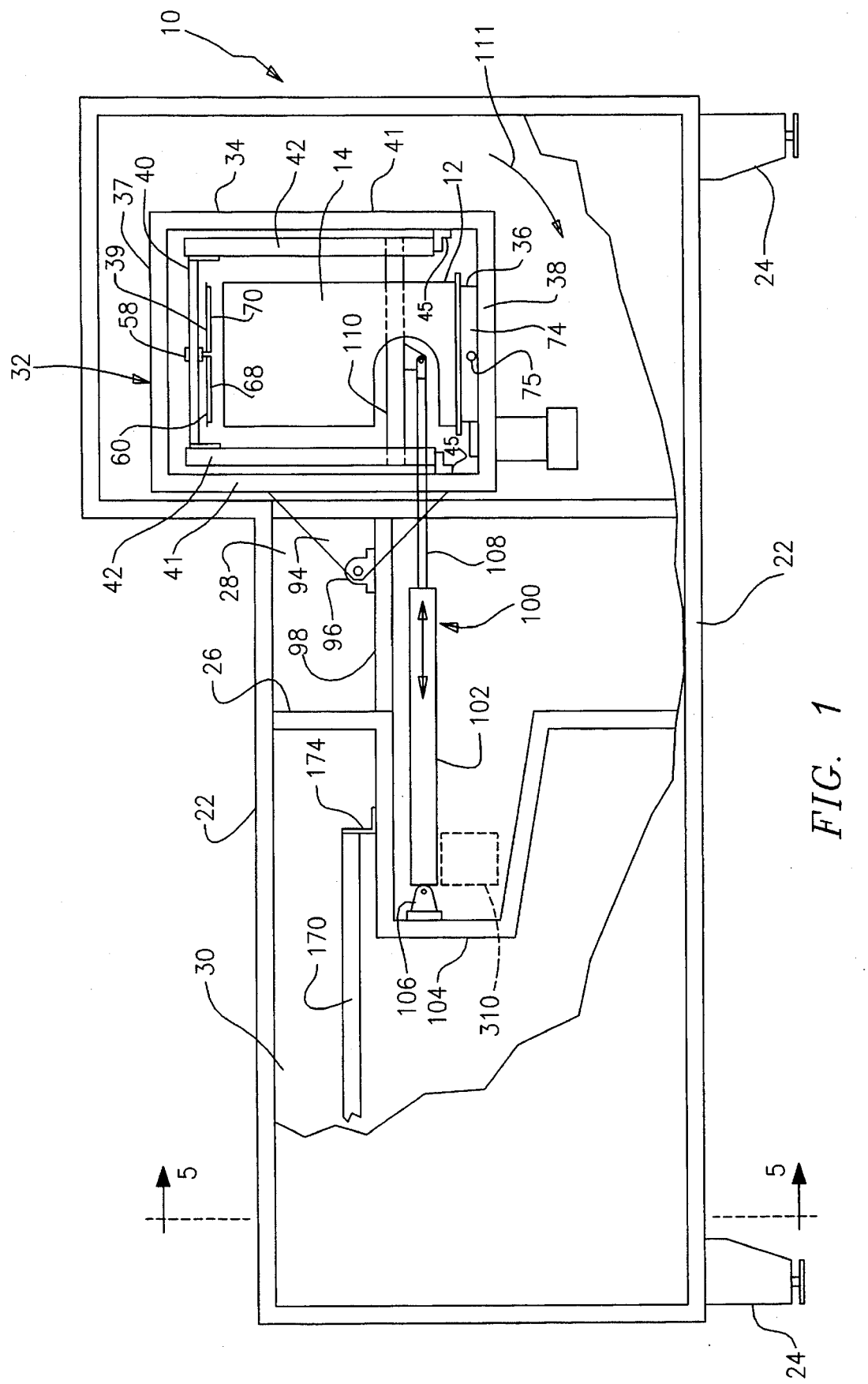

There is shown in FIGS. 1–5 an apparatus 10 for cleaning a cylindrical air filter 12. The air filter comprises any type of conventional filter of the variety commonly used in trucks, heavy equipment and similar machinery. Filter 12 includes inner and outer perforated cages, which are omitted for clarity, and a generally pleated paper filter medium 14. The filter medium includes an outside cylindrical surface 16 and an inside cylindrical surface 18, shown particularly in FIG. 2. A central bore or opening 20 extends through filter 12. The details of the filter's construction should be readily understood by those skilled in the art and do not comprise a feature of this invention.

Apparatus 10 comprises a sturdy housing or cabinet 22 that is composed of suitable metallic and plastic materials. The cabinet is mounted on a plurality of legs 24. Only two such legs are illustrated in FIGS. 1–4 but it should be understood that four or any other suitable number may be employed. Cabinet 22 is divided by a wall 26 into a first main chamber 28 and a second main chamber 30. Each of the chambers encloses respective components of apparatus 10, in the manner described below.

A filter carriage 32 is pivotally mounted in chamber 28. The forward side of the carriage is open to receive filter 12. Carriage 32 includes a frame 34 composed of a lower rectangular metal plate 38 with elongate tubular elements 41 interconnected to and extending upwardly from corners of the plate. Upper tubing 37 in the form of a rectangle interconnects elements 41. Lower engagement means comprising a rotating turntable or base 36 are mounted to the floor 38 of frame 34. Disk-shaped upper engagement means 39 are carried by an adjustable support structure 40 that is itself movably mounted to a pair of opposing rodless cylinders 42. These cylinders are otherwise bolted or secured to elements 41 of frame 34 by appropriate upper and lower horizontally transverse brackets 45. Filter 12 is received in an axially vertical condition between base 36 and upper engagement means 39. An orientation not precisely vertical, but more vertical than horizontal is also within the scope of the invention.

Figure 7:
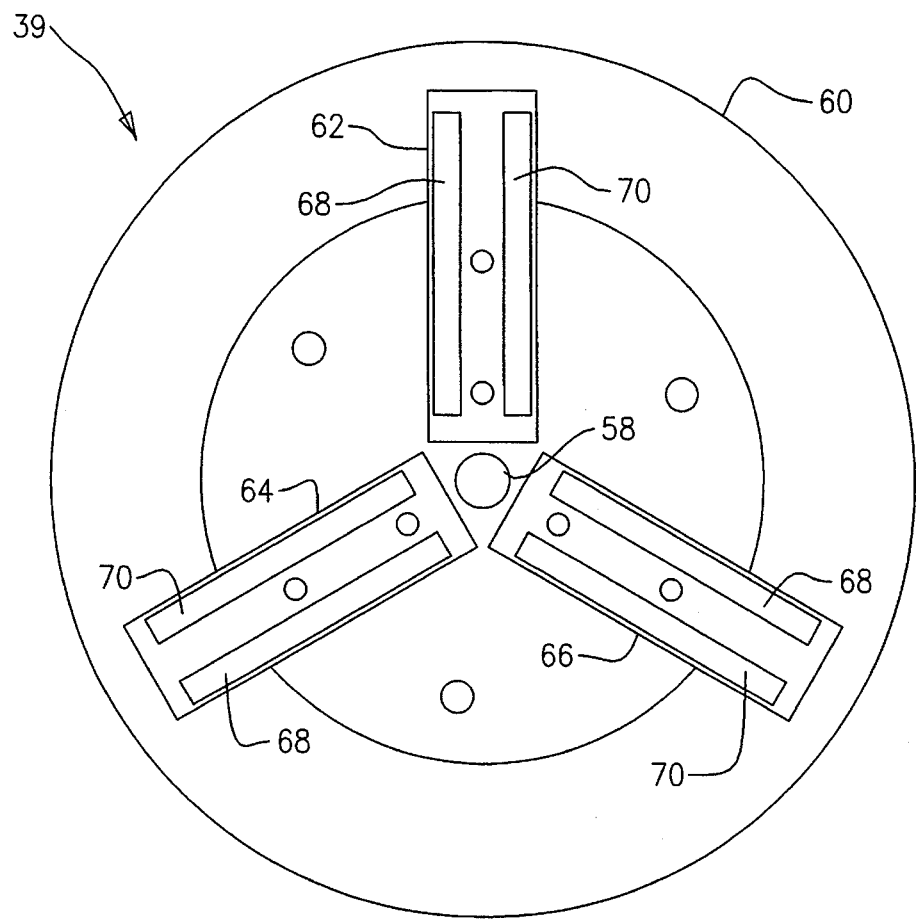
FIG. 7 is a bottom plan view of the upper engagement means in the carriage.

As shown in FIG. 6A and 6B, support 40 includes a pair of elongate tubular elements 46 and 48 that are interposed between and bolted, welded or otherwise attached to a pair of parallel upper and lower plates 50 and 52, respectively. At the center of plates 50 and 52 are formed a pair of parallel openings that receive an annular bushing 54. A zert grease fitting 56 is attached to bushing 54. Bushing 54 receives a shaft 58, shown in FIG. 7, that is fixedly attached to a disk-shaped plate 60 of upper engagement means 34. Three flat bars 62, 64 and 66 are mounted to plate 60 by bolts or other suitable means. A pair of rubber strips 68 and 70 are mounted longitudinally to each of the flat strips. These resilient strips engage and cushion the top end of filter 12, in the manner shown in FIG. 1.

The lower base 36 on which filter 12 is supported is illustrated in FIG. 8. An annular race assembly 72 is mounted to floor 38 of frame 34. Race assembly 72 includes a peripheral rim 74 that is fixed to and extends upwardly from floor 38. A peripheral race 76 is mounted to rim 74 by screws or bolts 78. A flat, annular plate 80 is rotatably received in annular race 76. An annular support 82 joins plate 80 to a driven gear 84. Similarly, support 82 joins plate 80 to an annular turntable or platform 88. The support 82 is welded or otherwise permanently joined between the respective elements. As a result, platform 88 is fixedly joined and rotates with driven gear 84. Gear 84 and platform 88 are rotated by a conventional motor 90. The motor operates a drive gear 92 that is operably engaged with driven gear 84.

An opening 81 is formed through floor 38 and similar, aligned openings 83 and 85 are formed through gear 84 and plate 80, respectively. Each of the openings 81, 83 and 85 is generally aligned with opening, 79 in platform 88. These aligned openings collectively define a passageway 89, see also FIG. 2, that communicates with the central opening 20 of a filter 12 placed on platform 88. As best shown in FIG. 1, a grease fitting 75 may be formed through rim 74 so that the gears may be lubricated when required.

Figure 9A:
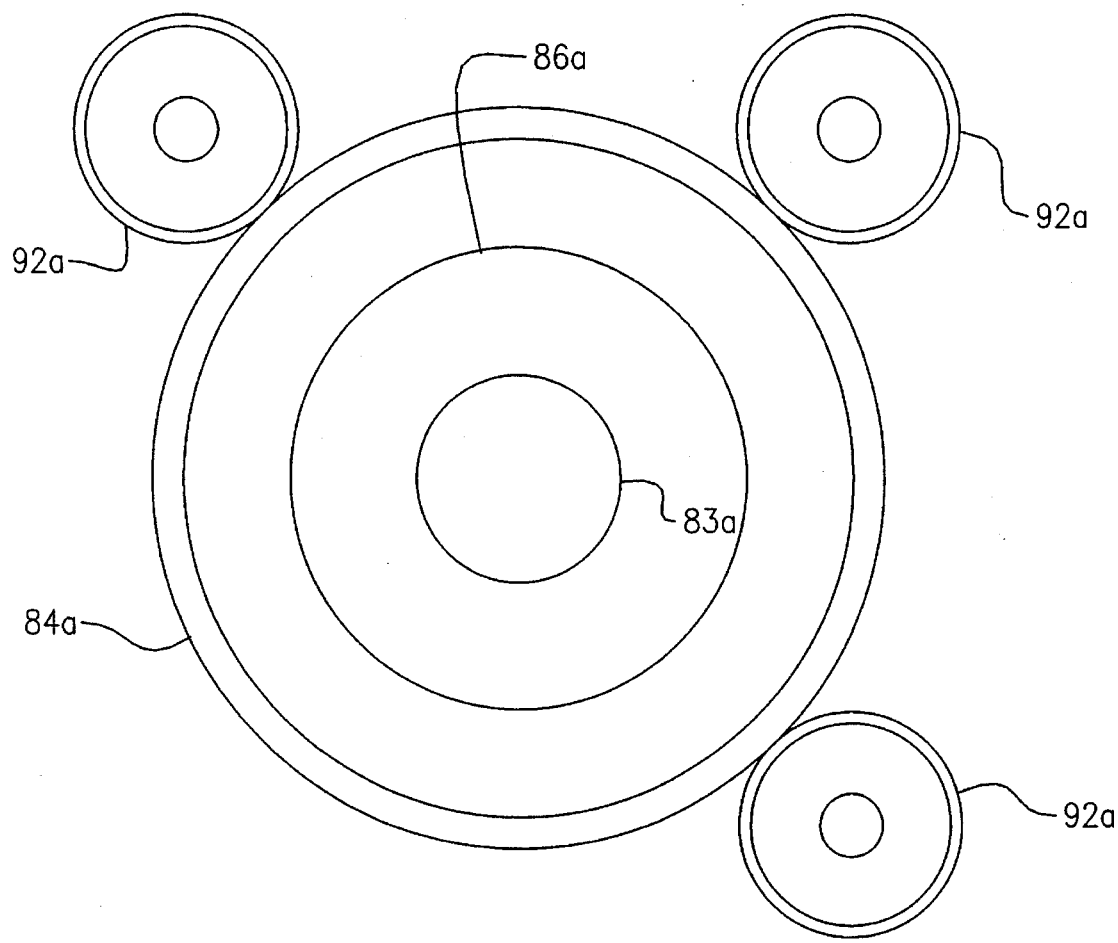
FIG. 9A is a simplified, plan view of an alternative lower engagement means and means for rotating the filter about its longitudinal axis.
Figure 9B:
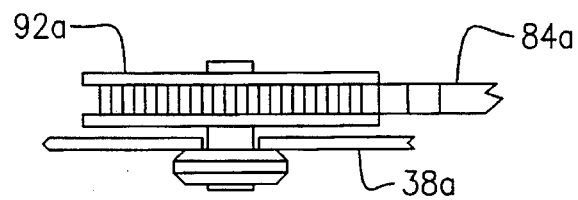
FIG. 9B is an elevational view of one of the supporting gears illustrated in FIG. 9A.

In the embodiment illustrated in FIG. 9A, the intermediate plate 80, as well as the race 76 and screws 78 are eliminated. Instead, driven gear 84a is connected to the annular turntable (see turntable 88 in FIG. 8) by means of an annular support wall 86a. Gear 84a is operably supported by a plurality of gears 92a in the manner shown more clearly in FIG. 9B. One of the gears 92a is driven by a motor in the manner described in the previous embodiment. The gears are connected to floor 38a.

Filter 12 is mounted within carriage 32 in the manner shown in FIG. 1. Normally, the cabinet includes an appropriate door that provides access into chamber 28. That door is omitted from the drawings for clarity. Cylinders 42 comprise conventional, rodless pneumatic cylinders that will be known to those skilled in the art. Support 40 is attached to the movable pistons of cylinders 42 by appropriate brackets. The cylinders are activated by conventional controller means, described below, such that support 40 is raised and lowered, as needed, to adjust the carriage for a filter of a particular size. Initially, cylinders 42 expand to raise support 40 and upper engagement means 39 to the highest, most open position. Filter 12 is then inserted by the operator in a generally vertical orientation between upper engagement means 39 and base 36. Specifically, the lower end of filter 12 is placed on platform 88 with the central filter opening, aligned with opening 79 in platform 88. Appropriate controls are activated to contract cylinders 42 such that support 40 is lowered and the rubber strips 68, 70 and 72 of engagement means 39 are engaged with the upper surface of the filter. As a result, filter 12 is held snugly in place in the carriage. The operator does not have to manually adjust upper and lower plates or other engagement means and safety is thereby improved.

Frame 34 of carriage 32 is pivotably mounted by means of a bracket 94 to a pivot mounting, 96 that is itself supported on a structural element 98 of cabinet 22. Pivot 96 permits carriage 32 to alternate between the upright position shown in FIG. 1 and the generally horizontal position shown in FIGS. 2–4. Initially, when filter 12 is introduced into apparatus 10 for cleaning, carriage 32 is in the position shown in FIG. 1. A cylinder mechanism 100 includes a cylinder portion 102 that extends from chamber 28 into a compartment 104. See also FIG. 5. The distal end of cylinder 102 is connected by a pivot 106 to a rearward wall of compartment 104. A piston rod 108 is operably connected to cylinder 102 in a conventional manner and the distal end of rod 108 is pivotably connected to a transverse frame element 110 that extends between rearward tubular elements 41 of carriage 32. Cylinder mechanism 100 is automatically controlled by an appropriate microprocessor or other control means such that the piston 108 expands and contracts relative to the cylinder 102. Initially, at the commencement of the cleaning, process, the rod 108 is extended out of the cylinder such that attached carriage 32 is held in the upright condition shown in FIG. 1. After filter 12 has been secured within carriage 32, rod 108 contracts within cylinder 102. This causes the entire carriage to turn, as indicated by arrow 111, about pivot 96 until the carriage is disposed in the generally horizontal condition shown in FIG. 2.

Figure 2:
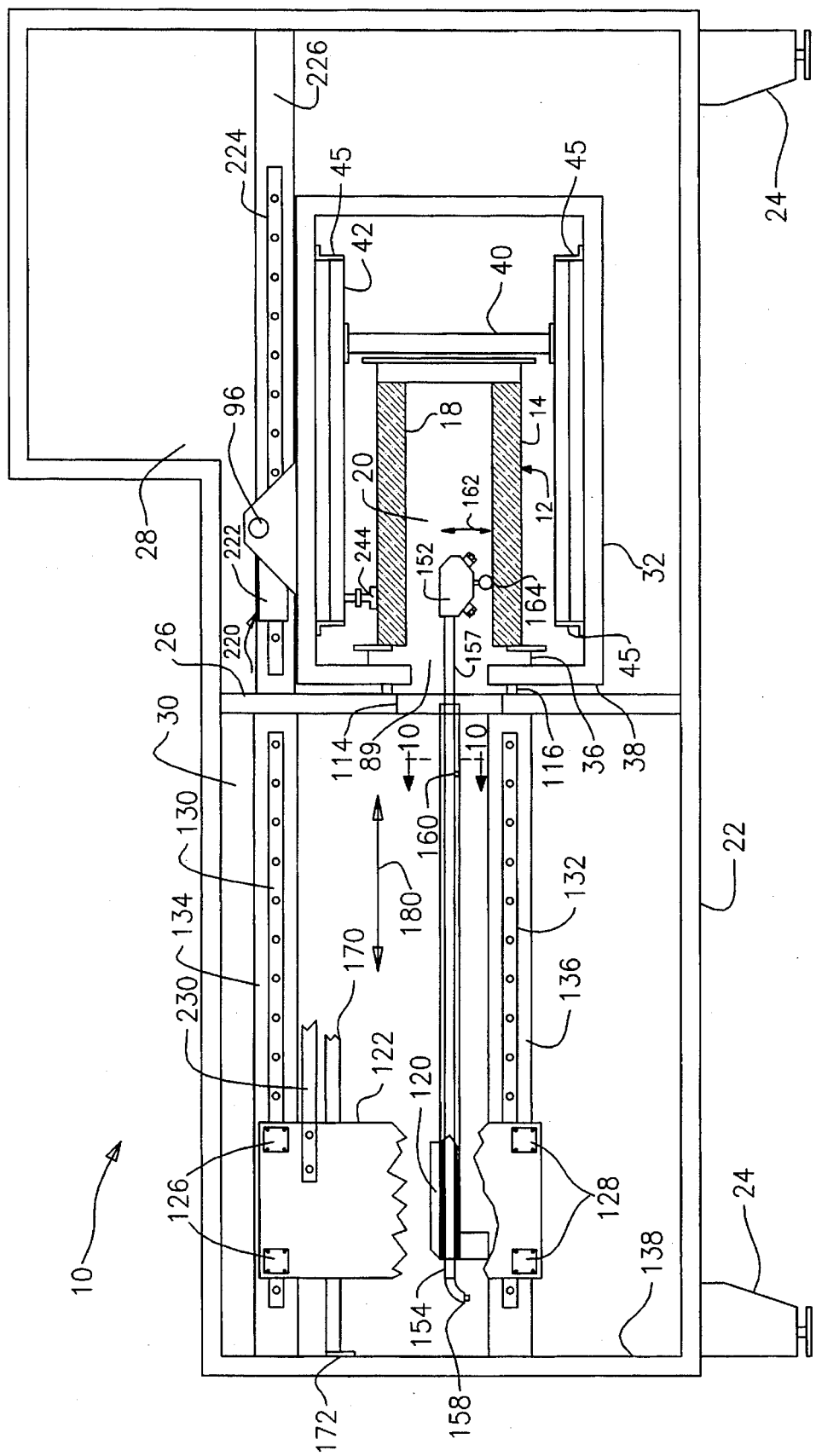

When carriage 32 is pivoted into the horizontal position shown in FIG. 2, the opening 89 formed through the base and floor of the carriage communicably engages an opening 114 formed through wall 26. As a result, the interior opening 20 of filter 12 communicates with the interior of chamber 30. An annular seal 116 is formed between carriage floor 38 and wall 26 about opening, 114.

Figure 5:
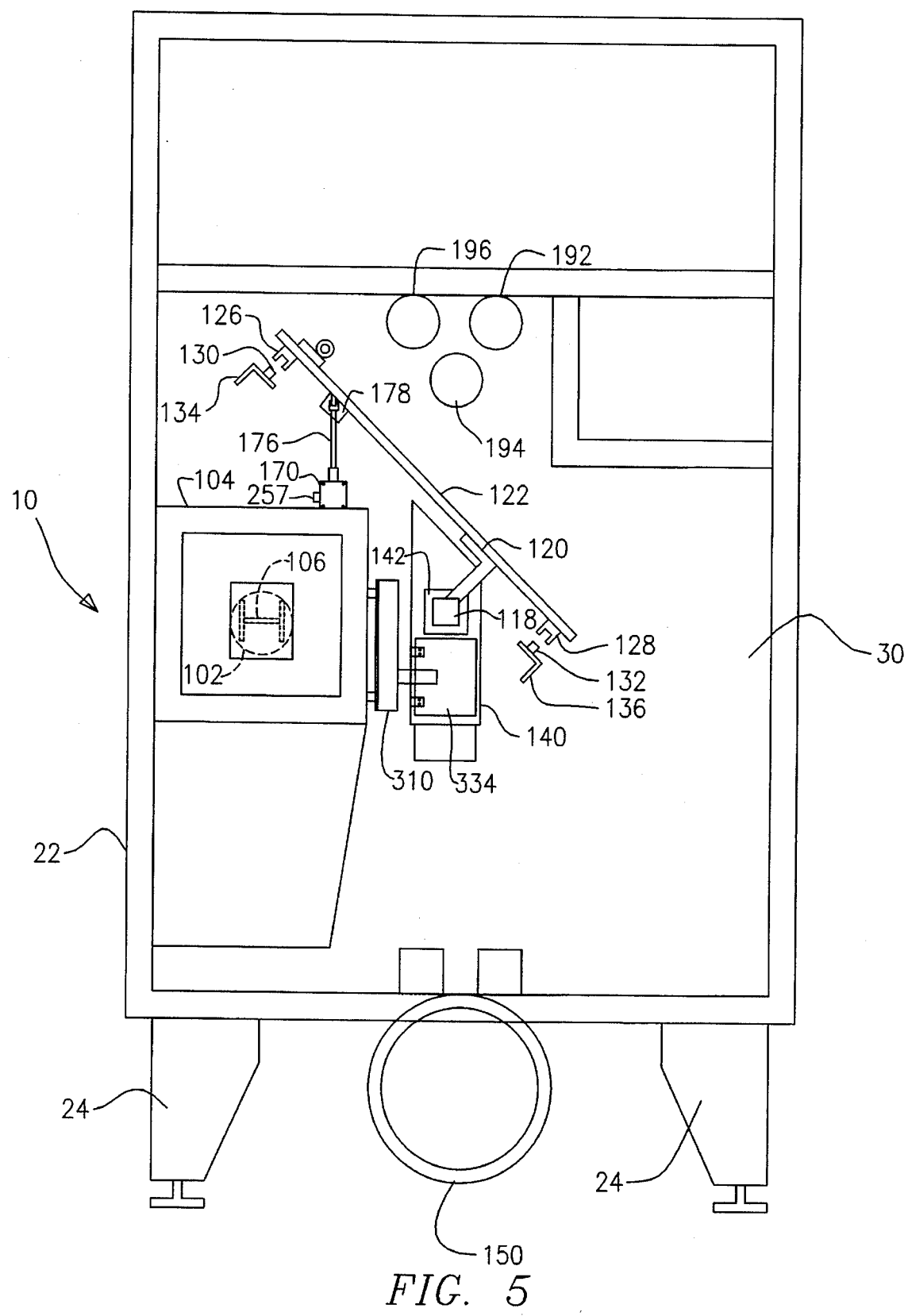
FIG. 5 is an elevational, cross sectional view taken along, line 5—5 of FIG. 1 illustrating the main components of the mechanism for driving the inside pressure nozzle and vacuum tube.
Figure 10:
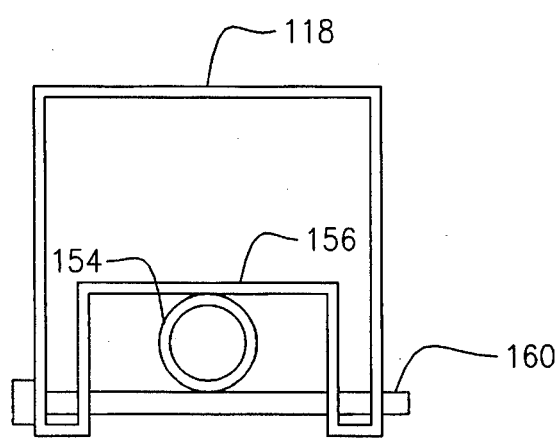
FIG. 10 is a cross sectional view taken along line 10—10 of FIG. 2.

Means are provided for dislodging and collecting dirt and debris from the inside surface 18 of filter 12. As best shown in FIGS. 2 and 5, an elongate vacuum tube 118 extends through chamber 30 and vacuum opening, 114. Tube 118, which is shown in cross section in FIG. 10, is secured by means of an L-shaped bracket 120, FIG. 2, to a generally flat drive plate 122. The attachment between tube 118 and bracket 120 and between bracket 120 and plate 122 is accomplished by bolts, welding or other suitable attachment means. As best shown in FIG. 5, plate 122 is oriented at an angle within chamber 30 and is movably mounted by means of bearings 126 and 128 to complementary rails 130 and 132, respectively. The rails are carried on respective elongate elements 134 and 136 that extend between the end wall 138 and wall 26 of chamber 30, as best shown in FIG. 2.

Figure 3:
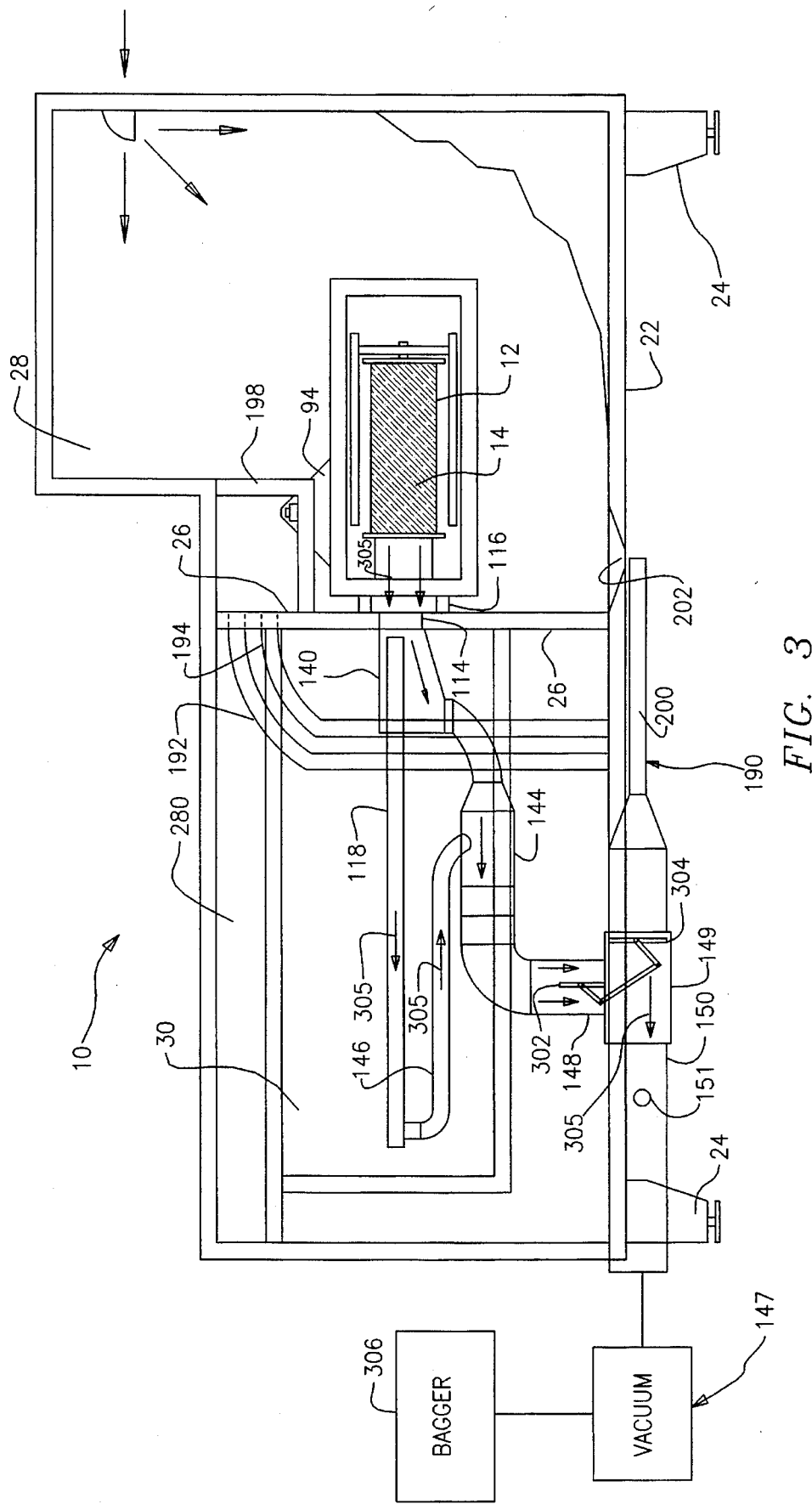

As illustrated in FIGS. 3 and 5, a forward portion of vacuum tube 118 extends through an inside vacuum manifold 140 that is itself communicably engaged with vacuum opening 114 in wall 26. An appropriate seal 142 is formed between the vacuum manifold and vacuum tube 118. Vacuum manifold 140 is communicably connected to an inside vacuum duct 144, FIG. 3, and vacuum tube 118 is likewise communicably connected to duct 144 through a vacuum hose 146. An outlet end 148 of duct 144 is selectively connected to a main vacuum exhaust conduit 150 through first inlet of a diverter valve 149, in a manner described more fully below. A vacuum source 147 connected to conduit 150 draws a vacuum on tube 118 and manifold 140. A dirt or particulate sensor 151 is mounted within main conduit 150. Sensor 151 measures the amount of dirt, dust or particulate matter that is being drawn out of the machine by vacuum 147. The sensor comprises any one of a number of conventional sensors that are employed in smoke stacks and other similar application where the volume of dirt in a quantity of air is being measured.

As shown in FIG. 2, apparatus 151 for dislodging dirt and debris from the inside surface 18 of filter 12 is mounted to vacuum tube 118. In particular, apparatus 151 includes a pneumatic head 152 including a pair of conventional air nozzles that are pointed at the inside filter surface of 18. Head 152 is operably connected to the end of pneumatic pressure hose 154 that extends through a channel 156 in tube 118, as shown in FIG. 10. End 158, FIG. 2, of hose 154 is connected in a known manner to a conventional pressurized air source, not shown. The pressure line 154 is attached in any suitable manner to the inside of channel 156, which extends along most of the length of vacuum tube 118. Proximate the distal end of the vacuum tube, the head 152 and line 154 are not fixed to the tube, but rather are movably attached by pivot pin 160, FIGS. 2 and 10. This permits head 152 to be selectively deflected, as indicated by double headed arrow 162 in FIG. 2. As a result, the nozzles on head 152 may be radially expanded to engage the inside surface 18 of air filters having various interior diameters. Head 152 extends into the interior opening 20 and is engaged with the interior surface 18 of filter 12 by a ball bearing 164. The air pressure nozzle head 152 serves to dislodge dirt and debris from the interior surface 18, as will be described more fully below.

Plate 122 is selectively driven back and forth along rails 130 and 132 so that dislodging apparatus 151 and vacuum tube 118 are moved longitudinally within central opening 20 of filter 12. Plate 122 is driven by a conventional rodless cylinder apparatus 170, FIGS. 2 and 5. One end of cylinder 170 is secured by a bracket 172 to end wall 138 of apparatus 10. As best shown in FIG. 1, the opposite end of cylinder 170 is attached by a second bracket 174 to the top surface of compartment 104. An operator arm 176, FIG. 5, interconnects the piston of rodless cylinder 170 to a bracket 178 carried on a bottom surface of plate 122. Suitable controls, described more fully below, direct cylinder 170 to drive plate 122 back and forth in the reciprocating fashion indicated by double headed arrow 180, FIG. 2. This drives the vacuum tube 118 and the air nozzle head 152 longitudinally through central opening 20 of air filter 12. As this operation is performed, the filter is rotated about its longitudinal axis by motor 90, FIG. 8. Pressured air is delivered through line 154 and the nozzles of head 152 and directed at the interior surface 18 of filter 12. This dislodges dirt and debris from that surface. At the same time, a vacuum is drown on tube 118 and manifold 140, in the manner described more fully below to collect the dislodged dirt and debris.

Means are also provided for dislodging and collecting dirt and debris from an outside cylindrical surface of the air filter. As shown in FIG. 3, an outside vacuum manifold 190 includes a plurality of vacuum pipes 192, 194 and 196 (the latter shown only in FIG. 5) that are communicably engaged with chamber 28 through respective openings in wall 26. It should be noted that frame element 198 represents a tubular support on which bracket 94 is pivotally mounted and does not represent an enclosure. Vacuum pipes 192, 194 and 196 are communicably engaged with the entire interior of chamber 28. Those vacuum pipes extend downwardly from wall 26 through chamber 30 and join an outside exhaust line 200, shown in FIG. 3. An additional outside vacuum outlet 202 interconnects the bottom of chamber 28 to outside vacuum line 200. Line 200 is communicably connected through a second inlet of diverter valve 149 to main vacuum exhaust conduit 150.

Figure 11B:
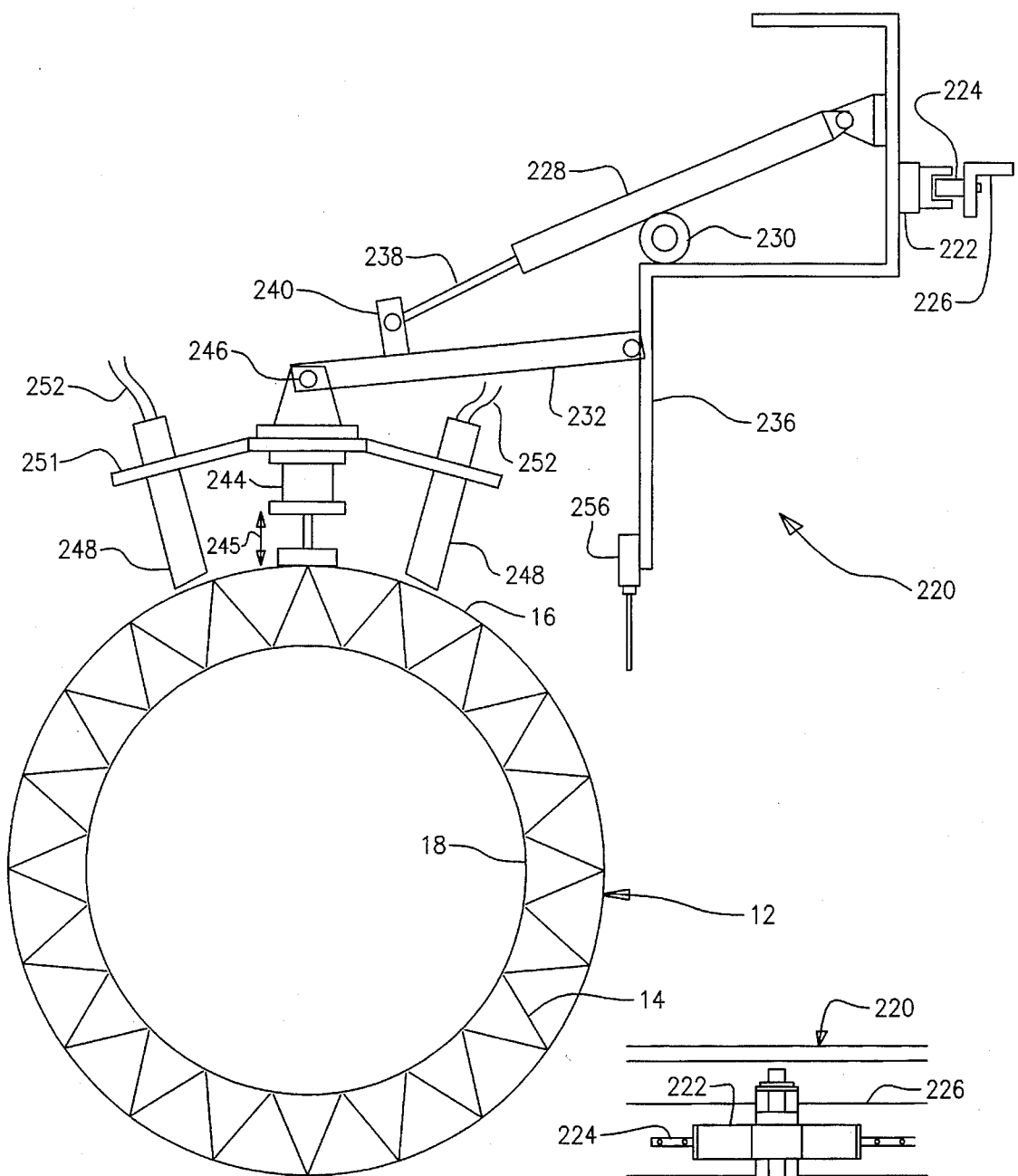
FIG. 11B is an elevational end view of the mechanism of FIG. 11A in engagement with the outside surface of the air filter being cleaned.
Figure 11A:
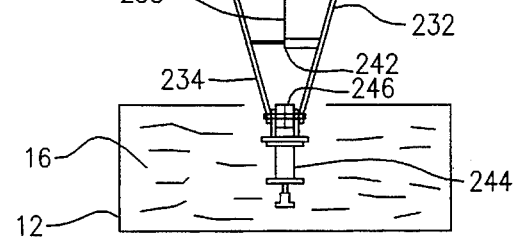
FIG. 11A is an elevation side view of the means for dislodging dirt and debris from the outside cylindrical surface of the air filter.

A device 220 partially depicted in FIG. 2 dislodges dirt and debris from the outside cylindrical surface 16 of filter 12. Side and top views of dislodging device 220 are more clearly shown in FIGS. 11A and 11B. Device 220 includes a metal or plastic cart 222 movably mounted on a rail 224. The rail is itself secured longitudinally to a support piece 226, which extends across chamber 28 (see also FIG. 2). A cylinder mechanism 228 is pivotally mounted to cart 222 in the manner best shown in FIG. 11B. A tubular element 230 is fixed to cart 222 and operates to drive the cart back and forth along the outside of the filter, in the manner described more fully below. A pair of support arms 232 and 234, FIGS. 11A and 11B, are pivotably connected to and extend from a depending portion 236 of cart 222. Cylinder mechanism 228 includes a piston rod 238 that is pivotally connected by joint 240 to a transverse support arm 242, FIG. 11A, which arm extends between support arms 232 and 234. A hammer mechanism 244 is secured by a pivot 246 to the distal ends of arms 232 and 234. The hammer is directed by an appropriate controller to reciprocate, as indicated by double headed arrow 245 and strike outer surface 16 of filter 12. A pair of outside pneumatic nozzles 248, shown in FIG. 11B but omitted for clarity in FIG. 11A, are attached by a plate 251 to hammer 244 and point at surface 16. Respective pneumatic hoses 252 interengage nozzles 248 and a conventional air pressure source. A switch 256, which may comprise a conventional pressure activated switch such as a microswitch, is carried by the lower end of depending, portion 236 of cart 222. This switch serves to monitor the number of passes made by the cleaning apparatus along the filter and to reverse direction of the dislodging, means. A second conventional reversing switch 257 is mounted to cylinder 170. The operation of these switches will be described more fully below.

As best shown in FIG. 2, the opposite end of tube 230 is secured to plate 122 by bolts, welding, or other appropriate means. The tube 230 extends through chamber 30 and through an appropriately sized opening in wall 26. From there, tube 230 extends through chamber 28 and is secured to cart 222 in the manner previously described. As plate 122 is driven in the direction of double headed arrow 180, FIG. 2, tube 230 likewise drives cart 222 along rail 224 so that the outside dislodging, mechanism 220 moves in tandem with the inside pressure nozzles, but along the outside surface 14 of filter 12. Tube 230 slides through a complementary opening in wall 26 and an appropriate seal is used between the tube and the wall so that chambers 28 and 30 remain isolated from one another.

Figure 12:
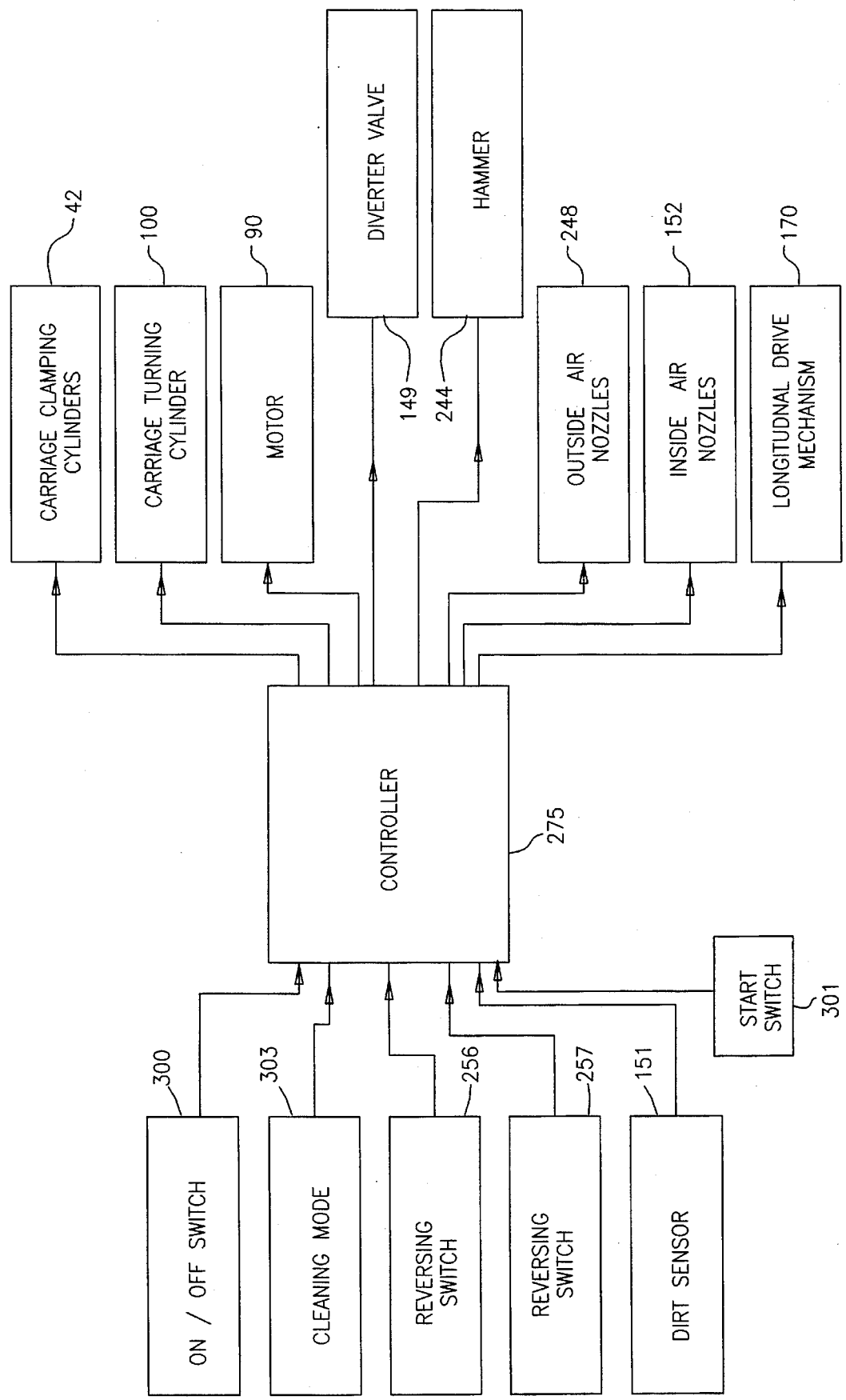
FIG. 12 is a block diagram of a preferred system for automatically controlling the operation of the cleaning apparatus.

As shown in FIG. 12, a controller 275 may be utilized to automatically control operation of apparatus 10. Controller 275 may comprise a conventional PLC programmed microprocessor or alternative means that may be programmed in a manner known to those skilled in the art. Controller 275 and an associated control panel are housed in upper compartment 280, FIG. 3, located above chamber 30. A door or other closure, not shown, may be mounted over the controls.

As shown in FIG. 12, controller 275 is selectively energized and de-energized by a control switch 300, which also operates lights, cooling, fans and other auxiliary devices. The controller also receives inputs from the switch 256 mounted on outside dislodging mechanism 220, from switch 257 on cylinder 170 and from dirt sensor 151 located within main exhaust conduit 150. The controller directs operation of the various moving, parts of apparatus 10 including, the carriage clamping, cylinders 42, the carriage turning, cylinder 100, motor 90, diverter valve 149, hammer 244, outside and inside air nozzles 248 and 152, nozzle pivot 160 and longitudinal drive cylinder 170. More particularly, the controller send signals to appropriate conventional means, such as solenoids, which selectively and sequentially activate and deactivate these mechanisms. The specifics of this structure and the interconnections between the controller and each mechanism receiving output from the controller are conventional and should be understood by those skilled in the art.

A filter 12 is cleaned by apparatus 10 in the following manner. Initially, switch 300 is activated. The filter to be cleaned is placed in carriage 32 between upper and lower engagement means 36 and 39. Start switch 301 is engaged is activated and controller 275 directs cylinders 42 to clamp filter 12 between upper and lower engagement members 36 and 39. The controller may be programmed to adjust cylinders 42 for a predetermined size of filter. Alternatively a limit switch or other known mechanism may be used to stop cylinders 42 when the filter is clamped. After filter 12 is secured, controller 275 directs cylinder 100 to contract so that carriage 32 and filter 12 are pivoted from the position shown in FIG. 1 to the position illustrated in FIGS. 2–4. The controller then directs motor 90 to axially rotate filter 12 and activates rodless cylinder 170 so that plate 122 is driven from left to right toward wall 26. As a result, attached vacuum tube 118 and inside nozzle mechanism 151 are driven longitudinally into the interior opening, 20 of filter 12. Similarly, rod 230 drives attached outside dislodging mechanism 220 along the outside surface of filter 12 in a left to right direction. As nozzle 152 moves longitudinally within opening 20, its nozzles direct blasts of pressurized air against the inside surface of the filter. For certain inside filters, the inside diameter of filter 12 is such that nozzle head 152 extends from line 154 in a generally straight manner, without bending. In other, larger inside diameter filters, head 152 pivots downwardly about pivot 160 so that bearing 164 engages the inside diameter and the inside nozzles are brought into close proximity with the inside surface of the filter. If an inside filter is being cleaned, dirt and debris are dislodged from surface 16. In either case, while the inside dislodging mechanism operates, controller 275 directs hammer 244 to impinge against the outer surface of the filter. Pressurized air from nozzles 248 are also directed against the outer surface 16 of filter 12. In an outside filter application, this causes dirt to be dislodged from the outer surface 16 of the filter.

Inside nozzle head 152 and outside dislodging device 220 make a number of longitudinal passes over the inside and outside surfaces, respectively, of filter 12. When the dislodging devices reach the right-hand end of the filter, the switch 256, FIG. 11B, carried by cart 236, engages an adjustable detonate (not shown) that is mounted to support 40 in carriage 32. As a result, switch 256 sends a signal to controller 275, FIG. 12, which directs the drive plate 122 to reverse direction. Inside dislodging mechanism 151 and outside dislodging mechanism 220 are drawn together longitudinally across the filter from right to left. Concurrently, the upper and lower engagement means and the horizontally aligned filter 12 are rotated about the longitudinal axis of the filter, in the manner previously described. When plate 122 reaches the left-hand end of cylinder 170, switch 257 causes the mechanisms 151 and 220 to again reverse direction and move from left to right. Accordingly, each pass of the filter dislodges dirt and debris from a successive longitudinal section of the filter surface. After a predetermined number of passes, dirt is dislodged from the entire inside surface 18 of filter 12 by nozzles 152 or, alternatively, from the entire outside surface 16 of filter 12 by hammer 244 and outside nozzles 248. The controller is programmed to repeat this reciprocating motion until virtually the entire filter surface is treated. A switch 303, FIG. 12, is used to select the cleaning mode. In the inside mode, greater air pressure is directed to the inside nozzles 151. In the outside mode, greater pressure is directed to the outside nozzles 248. In certain embodiments, appropriate switching, may be used to operate either inside or outside dislodging means, exclusively for a particular filter.

A critical feature of this invention is the ability of the apparatus for selectively clean either the inside or the outside surface of the air filter. In the embodiment disclosed herein, this is accomplished by attaching vacuum source 147 selectively to either perform outside or inside cleaning. In either event, when apparatus 10 is started, controller 275 or preferably a separate on/off switch activates vacuum 147. The operator then selects either an inside cleaning mode or an outside cleaning mode by engaging switch 303, FIG. 12. When the inside mode is selected, controller 275 directs diverter valve 149 to open a flap 302, as shown in FIG. 3, so that vacuum duct 144 is communicably connected with main exhaust conduit 150. A the same time, the diverter valve closes a second flap 304 so that the outside vacuum manifold 190 is blocked from main vacuum conduit 150 and vacuum 147. As a result, a vacuum is drawn in tube 118 and manifold 140. As dirt and debris are dislodged from the inside surface of filter 12, in the manner shown in FIG. 2, the suction created in tube 118 and manifold 140 collect the dislodged dirt and debris, and transmit it in the direction indicated by arrows 305 into a conventional bagger 306. As tube 118 moves longitudinally through filter 112 dirty dislodged air is sucked into the tube and removed through the vacuum line. Vacuum manifold 140 assists with this dirt collection. Inside cleaning is aided even further by introducing a continuous supply of fresh air into the interior of the filter as it is vacuumed. This is accomplished, by opening a door 310, shown in FIG. 5, that is formed in the side of compartment 104. Because compartment 104 is open to chamber 28, when the door 310 is open fresh, clean air is drawn into compartment 104 and chamber 28 from chamber 30. This fresh air is then drawn through filter 12 from outside to inside and is collected by the vacuum tube 118 and vacuum manifold 140. This fresh air effectively "backwashes" filter 12 and transports additional dirty air toward the inside vacuum mechanisms.

In the inside cleaning mode, rotation of the filter and interior vacuuming continue until the entire inside surface 16 has been treated by nozzles 152. Controller 275 is programmed so that the inside vacuuming process continues for a predetermined number of passes, rather than a predetermined time as in the prior art. The number of longitudinal passes are calculated in order to permit the entire inside surface to be impacted by the air nozzles. As a result, the entire inside surface area is treated regardless of the size or diameter of the filter.

Figure 4:
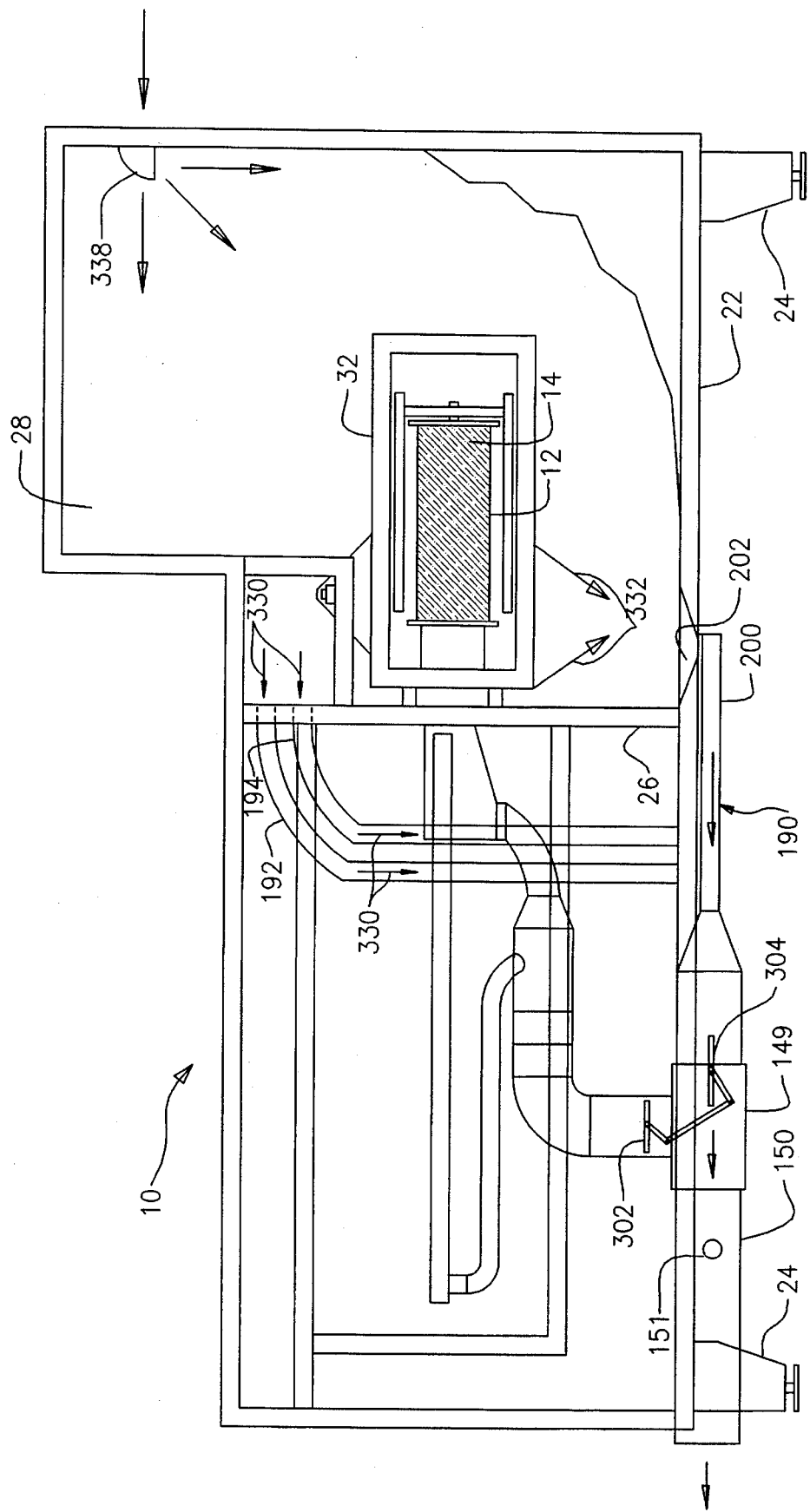
FIG. 4 is a view similar to FIG. 3 with operation of the outside vacuum means being illustrated.

An outside filter is vacuumed in the manner illustrated in FIG. 4. The operator first selects the outside mode and, again, the carriage 32 positions filter 12 horizontally within chamber 28. The filter is axially rotated in carriage 32, a vacuum is drawn and both the inside nozzles 152 and the outside dislodging mechanism 220 are driven longitudinally along the inner and outer surfaces, respectively, of filter 12. Because an outside filter is involved, dirt and debris are dislodged from the outside surface of filter 12. The dirt dislodging operation is performed in a manner analogous to that for the inside filter. Dislodging mechanism 220 is driven along the outside surface of the rotating filter for a predetermined number of passes until the entire outside surface is treated. However, in the outside cleaning mode, controller 275 directs diverter valve 149 to close flap 302 and open flap 304. As a result, inside vacuum duct 144, as well as vacuum tube 118 and vacuum manifold 140 connected thereto, are isolated from vacuum 147 and bagger 306. Instead, the vacuum is drawn on outside vacuum manifold 190. As a result, air and dislodged particulates are drawn in the direction indicated by arrows 330 through pipes 192, 194 and 196. Similarly, air and particulate matter that drops out of the rotating filter 12 are drawn, as indicated by arrows 332, into outlet 202 and vacuum line 200. All of this collected "outside" dirt is drawn through valve 149, main vacuum conduit 150 and directed into the exterior bagger 306. When the bagger is full, in either the inside or outside cleaning, modes, it is discarded and replaced in a conventional manner.

Means may also be provided for increasing air flow through chamber 28 so that outside cleaning, is facilitated. In particular, as shown in FIG. 5, a door 334 is operably attached to the back of inside vacuum manifold 140. During inside cleaning, door 334 remains closed. However, during, cleaning of an outside filter, door 334 is opened. This causes clean, fresh air to be drawn from chamber 30 in through manifold 140 and into chamber 28 through filter 12. The increased air circulation again backwashes the filter and helps to push the dirty air into outside vacuum manifold 190. It should be noted that during cleaning, of an "outside" filter door 310 into compartment 104 remains closed.

An air vent 338, FIG. 4, may be mounted in chamber 28. Vent 338 draws in dry, clean air primarily for the purpose of drying the filter. This air also improves circulation in chamber 28 and helps to push out dirty air into the vacuum lines.

During either inside or outside cleaning, dirt-filled air travels past sensor 151 on its way into the collection bagger. Sensor 151 measures the level of dirty air and sends signals representative of that measurement to the controller. When the level drops below a predetermined level, this indicates that the air being, vacuumed is relatively clean and that the filter is therefore clean. When this level is reached an appropriate audio or visual signal may be sounded on the control panel. Additionally, the cleaning, apparatus may be automatically deactivated. Accordingly, apparatus 10 may be programmed according to various parameters to ensure complete cleaning of the filter. Vacuuming may be conducted for a predetermined number of passes of either the inside air nozzles 152 or the outside dislodging mechanism 220 along the filter. Alternatively, vacuuming may be conducted for as long as sensor 151 measures that level of dirt being dislodged and vacuumed is above a predetermined level.

Various filter sizes may be mounted in carriage 32. The size of opening 79 in turntable 88 is reduced to accommodate smaller diameter filters by placing an annular attachment 400 on platform 88 in the manner shown in FIG. 13. As a result, a smaller opening 402 is formed and the filter is supported on the upper surface of attachment 400.

The filter cleaning apparatus disclosed herein exhibits a number of advantages. The filter is initially mounted in a vertically upright condition so that manual involvement in the mounting process is virtually eliminated. Additionally, only one type of cleaning (i.e. either inside or outside) is selected for each filter. This achieves much more effective and efficient cleaning than is exhibited by prior art devices. Preferred horizontally oriented cleaning is utilized so that dirt is not trapped in the pleats or corners of the filter. The apparatus employs a relatively quiet, automatic operation. Large, expensive air filters are cleaned quickly and effectively for reuse and, as a result, considerable monetary savings are achieved.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. An apparatus for cleaning a generally cylindrical air filter, said apparatus comprising:

a housing;

carriage means adjustably mounted in said housing for receiving and holding the air filter in a generally axially vertical orientation;

means mounted at least partly within said housing for selectively turning said carriage means to orient the filter generally horizontally;

means supported within said housing for dislodging dirt and debris from at least one of an inside cylindrical surface and an outside cylindrical surface of the filter when the filter is oriented generally horizontally; and suction means communicably intereagaged with said housing for collecting the dirt and debris dislodged from the filter.

2. The apparatus of claim 1 in which said first carriage means include upper engagement means that contact a first end of the filter, lower engagement means that contact an opposite second end of the filter and means for adjusting the distance between said upper and lower engagement means.

3. The apparatus of claim 1 in which the filter includes an inside cylindrical opening and said lower engagement means include an annular base that communicates with the inside cylindrical opening of the filter.

4. The apparatus of claim 3 in which said means for adjusting include selectively expandable and contractible cylinder means that are interconnected between said annular base and said upper engagement means, said cylinder means being expanded to increase the distance between said annular base and said upper engagement means and contracted to reduce the distance between said base and said upper engagement means.

5. The apparatus of claim 3 further including means for rotating said annular base, said upper engagement means and the filter about the longitudinal axis of the filter when the filter is generally horizontally oriented.

6. The apparatus of claim i further including a housing having a first chamber that contains said carriage means and the filter, an adjacent second chamber and a wall formed between said first and second chambers, said wall having a vacuum opening that is communicably engaged, on one side of said wall, by said annular base when the filter is horizontally oriented such that the cylindrical central opening of the filter communicates with said vacuum opening, said suction means including an inside vacuum manifold that communicably engages said vacuum opening on the opposite side of said wall.

7. The apparatus of claim 6 in which said means for turning include pivot means for mounting said carriage means within said housing, a cylinder mechanism pivotally attached to one of said carriage and said housing wall, and a piston operably engaged with said cylindrical means and pivotally attached to the other of said carriage and said housing wall, said cylinder mechanism and said piston being selectively contracted to turn said carriage about said pivot means in a first direction and communicably engage said annular base with said vacuum opening in said wall and expanded to turn said carriage in an opposite second direction about said pivot means and disengage said base from said vacuum opening.

8. An apparatus for cleaning a generally cylindrical air filter, said apparatus comprising:

a housing;

carriage means adjustably mounted in said housing for receiving and holding the air filter in a generally axially vertical orientation;

means mounted at least partly within said housing for selectively turning said carriage means to orient the filter generally horizontally;

means supported within said housing for dislodging dirt and debris from an inside cylindrical surface of the filter when the filter is oriented generally horizontally, said dislodging means including an air pressure nozzle disposed within and directed generally toward the inside surface of the filter when the filter is generally horizontally oriented and means providing pressurized air to said nozzle means to dislodge dirt from the inside surface of the filter; and suction means communicably interengaged with said housing for collecting the dirt and debris dislodged from the filter.

9. The apparatus of claim 8 in which said suction means include an elongate vacuum tube that is disposed within the cylindrical opening in the filter when the filter is generally horizontally oriented and means drawing a vacuum on said tube to create a suction that draws dirt dislodged from the inside surface of the filter into said tube.

10. The apparatus of claim 8 in which said means for providing pressurized air include a pressure line that extends along said tube.

11. The apparatus of claim 10 further including means for driving said tube and said pressure line generally longitudinally along the inside surface of the filter.

12. The apparatus of claim 10 in which said apparatus further comprises a housing having a first chamber for accommodating said carriage means, an adjacent second chamber and a wall separating said first and second chambers and having a vacuum opening formed therethrough and engaged communicably by the cylindrical opening of the filter when the filter is generally horizontally oriented, said vacuum tube and pressure line extending from said second chamber through said vacuum opening and into the cylindrical opening of the filter located in said first chamber.

13. The apparatus of claim 1 in which said dislodging means include a hammer apparatus and means for directing said hammer to selectively strike the outside cylindrical surface of the filter.

14. The apparatus of claim 13 further including means for driving said hammer along a path generally parallel to the axis of the filter when the filter is generally horizontally oriented.

15. The apparatus of claim 1 further comprising a housing having a first chamber for accommodating said carriage means, a second adjacent chamber separated from said first chamber by a wall and outside vacuum means that communicate with said first chamber and extend at least partly through said second chamber for collecting dirt and debris dislodged from the outside surface of the filter.

16. The apparatus of claim 8 in which said suction means further include an outside vacuum manifold communicably connected to said first chamber outwardly of the outside surface of the filter.

17. The apparatus of claim 16 in which said suction means further include a vacuum source and valve means for selectively connecting said vacuum source to one of said inside and outside vacuum manifolds to clean the inside and outside surfaces, respectively, of the filter.

18. The apparatus of claim 1 further including, means located on said suction means for sensing the level of dirt and debris being collected and control means for deactivating said dislodging means and returning said carriage to the generally axially vertical orientation when the dirt and debris being, collected drops below a predetermined level.

* * * * *